Figure 1:
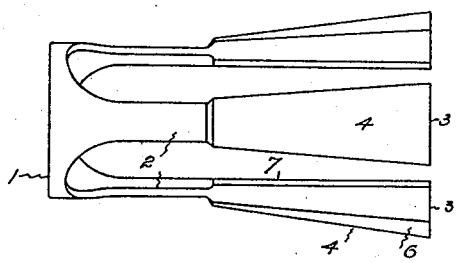

E. L. PFUNDER.
CHUCK COLLET.
APPLICATION FILED JAN. 7, 1921.

1,413,680.

Patented Apr. 25, 1922.

INVENTOR
Emil L. Pfunder
BY Harry P. Williams
ATTORNEY

UNITED STATES PATENT OFFICE.

EMIL L. PFUNDER, OF WINDSOR, CONNECTICUT, ASSIGNOR TO THE J. M. NEY COMPANY, OF HARTFORD, CONNECTICUT, A CORPORATION OF CONNECTICUT.

CHUCK COLLET.

1,413,680.      Specification of Letters Patent.    Patented Apr. 25, 1922.

Application filed January 7, 1921. Serial No. 435,585.

*To all whom it may concern:*

Be it known that I, EMIL L. PFUNDER, a citizen of the United States, residing at Windsor, in the county of Hartford and State of Connecticut, have invented a new and useful Improvement in Chuck Collets, of which the following is a specification.

This invention relates to the construction of spring jaw collets, that is, those devices which are pushed or pulled bodily into tapering sockets in the bodies of precision chucks designed to be applied to lathes, screw machines, milling machines and the like machine tools, and which are employed for holding stock where great accuracy is required and when a large number of pieces of the same or practically the same size are to be formed.

The object of the invention is to provide a spring jaw chuck collet having such flexibility and shape that it will function within certain limits very much like independent jaw drill and lathe chucks, and which has greater range or capacity with a firmer grip on the stock without affecting its accuracy or marring the stock held, than the commonly employed spring jaw collets.

The taper and curvature of the outer faces of the jaws of the common conical collets exactly fit the taper and curvature of the wall of the conical socket in which they are located in but one position, which is known as normal position and determines the size of the stock which the particular collet is designed to be used with. If the stock is over normal size the collet will not go back into the socket to normal position and consequently the arcs of the outer faces of the jaw remaining the same while they occupy a space which is larger in diameter, the jaws bear against the walls of the socket with line contacts. This, particularly with chucks of large size and doing heavy duty, is objectionable for it allows the jaws to rock, a condition which impairs efficiency. If the stock is under normal size the jaws move back into the socket farther than normal position and as the opening is smaller in diameter while the arcs of the outer faces of the jaws remain the same only the corners at the backs of the jaws will bear against the conical wall of the socket. With the common collet that has three, four or more jaws separated by radial slots of uniform width cut back from the end to give the necessary elasticity the larger ends of the jaws close a greater distance or faster than the smaller ends as the collet moves in beyond the locality of normal fit. This action causes the outer ends of the jaws to bind under size stock while the smaller ends grip but lightly if at all. In the prior collets in which the jaws are separated by segmental slots, the smaller ends of the jaws close a greater distance or faster than the larger ends as the collet is moved in beyond the locality of normal fit, an action which causes the inner ends of the jaws to bind undersized stock while the outer ends grip but slightly if at all. In both of these cases there is a condition which increases the liability of irregularity of the work accomplished and limits each collet to practically one size and consequently necessitates the keeping on hand of a large number of collets in order that one chuck body may be used for holding stock of different diameters. The object of the present invention is attained by so cutting the slots and thus shaping the back bearing surfaces of the jaws that the holding edges of the jaws will open and close parallel with the axis of the chuck.

Figure 2:
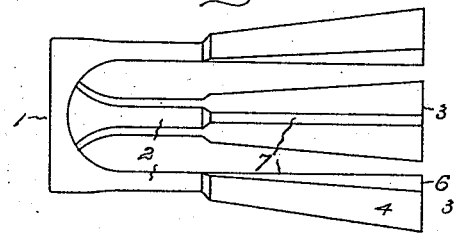
Figure 3:
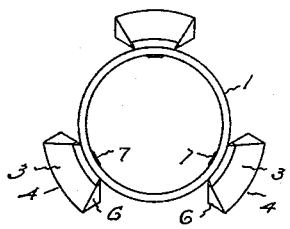
Figure 4:
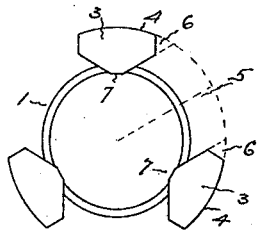
Figure 5:
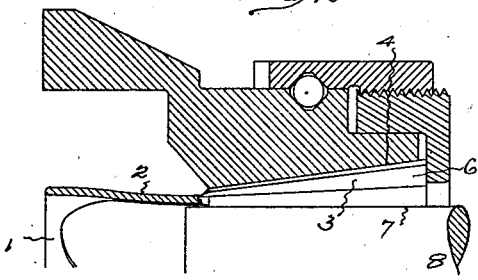
Figure 6:
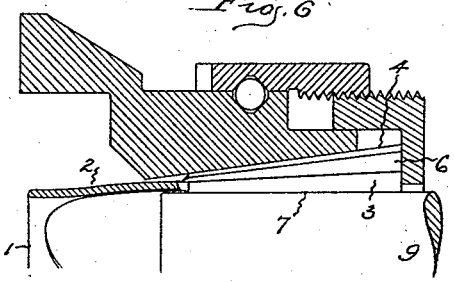
Figure 7:
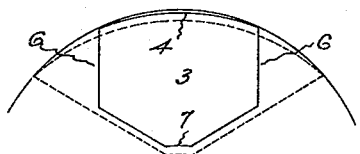

In the accompanying drawings Fig. 1 shows a side view of a three jaw collet which has its jaws so shaped and connected with the band in such manner that in being pulled or pushed back into the conical socket in which it is used the inner or holding edges of the jaws will close practically parallel on the stock, thus eliminating the above mentioned defects of the prior collets and providing wider range of action whereby fewer collets for different sizes of stock are required. Fig. 2 shows a side view of the same collet rotated sixty degrees. Fig. 3 is a view looking toward the smaller or band end of the collet. Fig. 4 is a view looking toward the larger or jaw end of the collet. Fig. 5 is a view illustrating a jaw of the collet in the position occupied in the chuck socket when holding an under size piece of stock. Fig. 6 is a view illustrating a jaw of the collet in the position occupied in the chuck socket when holding an over size piece of stock. Fig. 7 is a diagram illustrating the relations of the outer faces of the larger ends of the jaws of the collet as ordinarily made and also the improved collet to the wall of the socket of a chuck body when drawn in beyond normal position.

The collet shown at the smaller end has an annular band 1, extending from which are three narrow thin flexible arms 2 that form the shanks of the jaws 3. The outside faces 4 of the jaws are turned and ground on such a circle and taper that they exactly coincide with and fit the curved and inclined wall of the conical socket in which the collet is to be used when in normal position, that is, when the jaws are closed upon a piece of stock of the size for which the collet is rated. The openings between the jaws are made by first cutting three wide radial slots 5 on radii one hundred and twenty degrees apart as indicated by dotted lines on Fig. 4, after which the side edges 6 of the jaws are cut away more at the large than at the small ends of the jaws so as to reduce the width of the jaws at the larger ends. These side cuts are desirably made with a pair of sixty degree cutters and reduce the arcs of the outer surfaces at the large ends of the jaws to a less number of degrees than the arcs of the outer surfaces at the small ends of the jaws. The inner or holding edges 7 of the jaws are ground to a diameter to receive stock of the normal rated size of the particular collet.

By separating the jaws with wide spaces and narrowing up the larger ends of the jaws so that they have a less number of degrees of bearing surface, the larger ends of the jaws not only conform more closely to the wall of the socket than they otherwise would, as illustrated in Fig. 7, but they close in less rapidly when drawn back so that the jaws will contract radially the same at both ends. If the large and small ends of the jaws have the same number of degrees, as would be the case if segmental slots were cut between them, the small ends of the jaws would contract faster than the large ends but by shaping the jaws as shown the holding edges of the jaws will be forced upon the stock equally along their entire length. With the wide slots between the jaws and the thin narrow shanks which connect the jaws to the band great lateral flexibility is obtained, which combined with the shape of the jaws that cause the large and small ends to travel inward equally gives a wide range of action. In Fig. 5 the conditions is illustrated when a jaw is closed upon a piece of under size stock 8 in a chuck of the character shown and described in my application for letters for Patent No. 298077, filed May 19, 1919. In Fig. 6 the condition is illustrated when a jaw is closed upon a piece of over size stock 9. In Fig. 7 the closeness of fit to the wall of socket of the present jaw, shown in full lines, over the fit of a wide jaw of the old type and of the same radius, shown in dotted lines, is illustrated. Should there be a nub or any roughness on the stock to be held by this collet the stock may be turned so that the projection or protuberance comes between the jaws. The jaws of this collet are sufficiently wide on their back faces to eliminate any possibility of the jaws rocking or yielding when the work is heavy, although as stated narrowing up the front or larger ends of the jaws in the manner described causes the jaws to have more nearly line contacts with the wall of the socket than they otherwise would if the jaws were not so narrowed.

The invention claimed is:

1. A chuck collet comprising jaws attached to yielding shanks, said jaws having curved axially inclined outer bearing surfaces, axially parallel inner holding edges, tapering inner faces extending outwardly from the holding edges, the planes of said inner faces of the adjacent jaws being parallel with each other, and tapering side faces extending between said inner faces and said outer bearing surfaces, the planes of said side faces of the adjacent jaws being one hundred and twenty degrees with relation to each other.

2. A chuck collet comprising jaws attached to yielding shanks, said jaws having curved axially inclined outer bearing surfaces, axially parallel inner holding edges, tapering inner faces extending outwardly from the holding edges, and tapering side faces extending between said inner faces and said outer bearing surfaces, the planes of said inner faces of the jaws being tangent to the same cylinder.

3. A chuck collet comprising jaws attached to yielding shanks, said jaws having axially parallel inner holding edges and curved axially inclined outer bearing surfaces, the degree of curvature of the bearing surfaces at the larger and smaller ends of the jaws being so related to each other and to the inclination of the bearing surface that the holding edges are always parallel with the axis when the collet is drawn into the conical socket in the chuck with which it is used for holding stock.

4. A chuck collet comprising an annular band, thin narrow flexible arms projecting from the band and tapering jaws with their small ends attached to the arms, said jaws having narrow inner holding edges parallel with the axis of the collet, and curved tapering bearing faces inclined to said holding edges, the taper of said curved inclined bearing surfaces of the jaws being such that substantially the same amount of radial inward movement of the large and small ends of the jaws is obtained when the collet is drawn into the conical socket in the chuck in which it is used.

EMIL L. PFUNDER.